(12) United States Patent
Li et al.

(10) Patent No.: US 10,564,523 B2
(45) Date of Patent: Feb. 18, 2020

(54) CONSTANT-FOCUS CAMERA MODULE

(71) Applicants: TRIPLE WIN TECHNOLOGY(SHENZHEN) CO.LTD., Shenzhen (CN); HON HAI PRECISION INDUSTRY CO., LTD., New Taipei (CN)

(72) Inventors: Kun Li, Guangdong (CN); Shin-Wen Chen, New Taipei (TW); Hao-Zhong Liu, Guangdong (CN); Long-Fei Zhang, Guangdong (CN)

(73) Assignee: TRIPLE WIN TECHNOLOGIES (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/053,555

(22) Filed: Aug. 2, 2018

(65) Prior Publication Data

US 2019/0391465 A1    Dec. 26, 2019

(30) Foreign Application Priority Data

Jun. 25, 2018 (CN) .......................... 2018 1 0664668

(51) Int. Cl.
*G03B 17/12* (2006.01)
*G03B 17/08* (2006.01)
*H04N 5/225* (2006.01)

(52) U.S. Cl.
CPC ............. *G03B 17/12* (2013.01); *G03B 17/08* (2013.01); *H04N 5/2253* (2013.01)

(58) Field of Classification Search
CPC ....... G03B 17/12; G03B 17/08; H04N 5/2253
See application file for complete search history.

(56) References Cited

U.S. PATENT DOCUMENTS

| 2014/0002676 A1* | 1/2014 | Ning | G02B 7/14 |
| | | | 348/187 |
| 2017/0192340 A1* | 7/2017 | Warren | B29C 65/4835 |
| 2017/0223245 A1* | 8/2017 | Park | G02B 7/04 |

FOREIGN PATENT DOCUMENTS

TW        201827875        8/2018

* cited by examiner

*Primary Examiner* — Nicholas G Giles
(74) *Attorney, Agent, or Firm* — ScienBiziP, P.C.

(57) ABSTRACT

A camera module reinforced against excessive torque forces when being installed includes a lens bracket and a lens barrel. The lens bracket includes an internally-threaded receiving barrel, the lens bracket having external threads around its circumference. The external threads match the internal threads, and lower end of the lens bracket includes an annular groove, a resilient ring being received in the annular groove.

18 Claims, 4 Drawing Sheets

CONSTANT-FOCUS CAMERA MODULE

FIELD

The subject matter herein generally relates to cameras.

BACKGROUND

An camera module includes a lens bracket and a lens barrel, and usually the lens bracket and a lens barrel are assembled and locking together using screws. However, a pulsation can happen because of torsion unevenness or abrupt change in torsion force. The phenomenon of torsion pulsation can lead to the camera module being out-of-focus. When dispensing glue, the lens barrel may be inaccurately fixed.

Therefore, there is room for improvement within the art.

BRIEF DESCRIPTION OF THE DRAWINGS

Implementations of the present technology will now be described, by way of example only, with reference to the attached figures.

DETAILED DESCRIPTION

Figure 1:
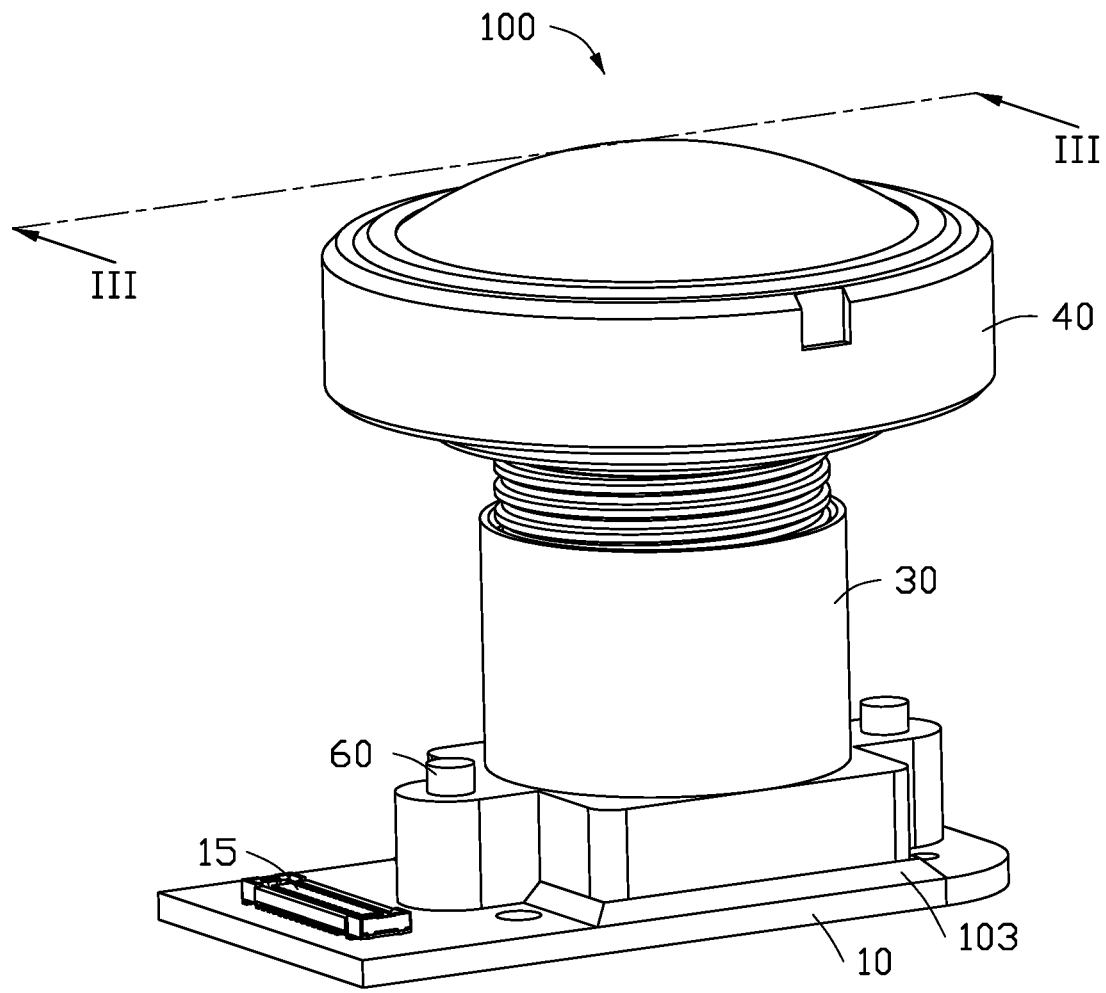
FIG. 1 is an isometric view of a camera module in accordance with one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to show details and features of the present disclosure better. The disclosure is showed by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 shows a camera module 100 according to one embodiment. The camera module 100 includes a printed circuit board 10, an image sensor 20 mounted on the printed circuit board 10, a lens bracket 30 mounted on the printed circuit board 10, and a lens barrel 40 matching with the lens bracket 30.

The printed circuit board 10 can be a flexible circuit board, a rigid board, or a rigid-flexible board. In the embodiment, the printed circuit board 10 is rigid board. The image sensor 20 is mounted on one side of the printed circuit board 10, and a connector 12 is mounted on the printed circuit board 10 and adjacent to the image sensor 20. The connector 12 is electrically connected to the image sensor 20 and configured to transmit signals between the camera module 100 and external electrical components.

The lens bracket 30 in this embodiment includes a pedestal 32 and a receiving barrel 34. The pedestal 32 is substantially square and includes a top surface 33. The receiving barrel 34 includes a circumference side wall 340 protruding from the top surface 33 and extending away from the top surface 33. The pedestal 32 includes a hollow accommodation space 320, and the hollow accommodation space 320 communicates with the receiving barrel 34 and covers the image sensor 20.

The receiving barrel 34 includes an inner surface 342, and the inner surface 342 defines internal threads 344. A supporting portion 350 is formed at a junction inside the hollow accommodation space 320 and the receiving barrel 34. The supporting portion 350 extends radially along the circumference side wall 340. The supporting portion 350 opens with a through hole 353 for light entry.

The supporting portion 350 includes a top end surface 352 toward the internal threads 344, and the top end surface 352 defines a first circular receiving groove 354 below the internal threads 344. The first circular receiving groove 354 is configured to receiving thread particles, thread particles are parts of the thread are scraped off during rotation. The top end surface 352 includes a circular flange 356 surrounding the first circular receiving groove 354. Surface of the circular flange 356 is covered with a layer of black adhesive 358. The black adhesive 358 is not solidified. The circular flange 356 and adhesive cover holds thread particles and prevents same falling onto the image sensor 20. In addition to holding thread particles, the black adhesive 358 is able to absorb stray light.

The lens barrel 40 includes an optical lens portion 42 and an assembly section 44 located at one end of the optical lens portion 42. In the embodiment, the assembly section 44 is formed with the optical lens portion 42 in a mold. The assembly section 44 is substantially cylindrical and includes external threads 444. Lower end of the assembly section 44 includes a second annular receiving groove 46 and a convex ring 48 located below the second annular receiving groove 46.

A resilient ring 50 is received in the second annular receiving groove 46. An outer diameter of the resilient ring 50 in the second annular receiving groove 46 is larger than diameter of the external threads 444. The lens barrel 40 is received in the lens bracket 30, the external threads 444 of the assembly section 44 matching with the internal threads 344 of the receiving barrel 34, and the resilient ring 50 is clamped between the second annular receiving groove 46 and the internal threads 344.

A cross-section of the resilient ring 50 is substantially round or square. The elastic ring 50 has a good elasticity and is able to greatly deform. The resilient ring 50 is able to infill the second annular receiving groove 46 and gaps between the internal threads 344. The internal thread 344 bites into and clamps the resilient ring 50 to lock the assembly section 44, and this reduces the influence of different torsions as regards the relative positioning of the lens barrel 40 and the lens bracket 30. The camera module 100 will not be out of focus, and the focusing efficiency is improved.

The convex ring 48 is configured to limit the position of the elastic ring 50, preventing the elastic ring 50 from slipping off the second annular receiving groove 46. The convex ring 48 is not in contact with the internal threads 344, so thread particles below the elastic ring 50 is avoided.

The camera module 100 includes a third annular receiving groove 101. The third annular receiving groove 101 is formed by a top end of the circumference side wall 340 and the assembly section 44. Thickness of upper end of the circumference side wall 340 is less than thickness of the lower end of the circumference side wall 340. The external threads 444 are formed below the third annular receiving groove 101, this prevents the receiving barrel 34 from cracking when the assembly section 44 is rotated into the lens bracket 30.

When the focal length of the camera module 100 is adjusted, a glue may be dispensed in the third annular receiving groove 101 to lock the lens barrel 40 and the lens bracket 30 and to make the camera module 100 waterproof The lens bracket 30 is fixed on the printed circuit board 10 by glue or screws. In the embodiment, the lens bracket 30 is fixed on the printed circuit board 10 by screws. The printed circuit board 10 further includes two fixing holes 110, the lens bracket 30 includes two fixing board 301 protruding away from side surface of the pedestal 32 and each fixing board 301 includes a mounting hole 310. The mounting hole 310 is matched with the fixing hole 110 and screw bolt 60 is inserted into the mounting hole 310 and the fixing hole 110 to fix the lens bracket 30 on the printed circuit board 10. A sealing glue 103 is disposed on the printed circuit board 10 to seal periphery of the pedestal 32.

The sealing glue 103 has two uses. First, the fixing of the lens bracket 30 and the printed circuit board 10 is strengthened to prevent the lens bracket 30 from loosening off the printed circuit board 10. Second, the hollow accommodation space 320 is sealed against moisture reaching the image sensor 20. The sealing glue 103 can be heat conductive adhesive, thus heat generated by the image sensor 20 can be taken from the camera module 100.

Figure 2:
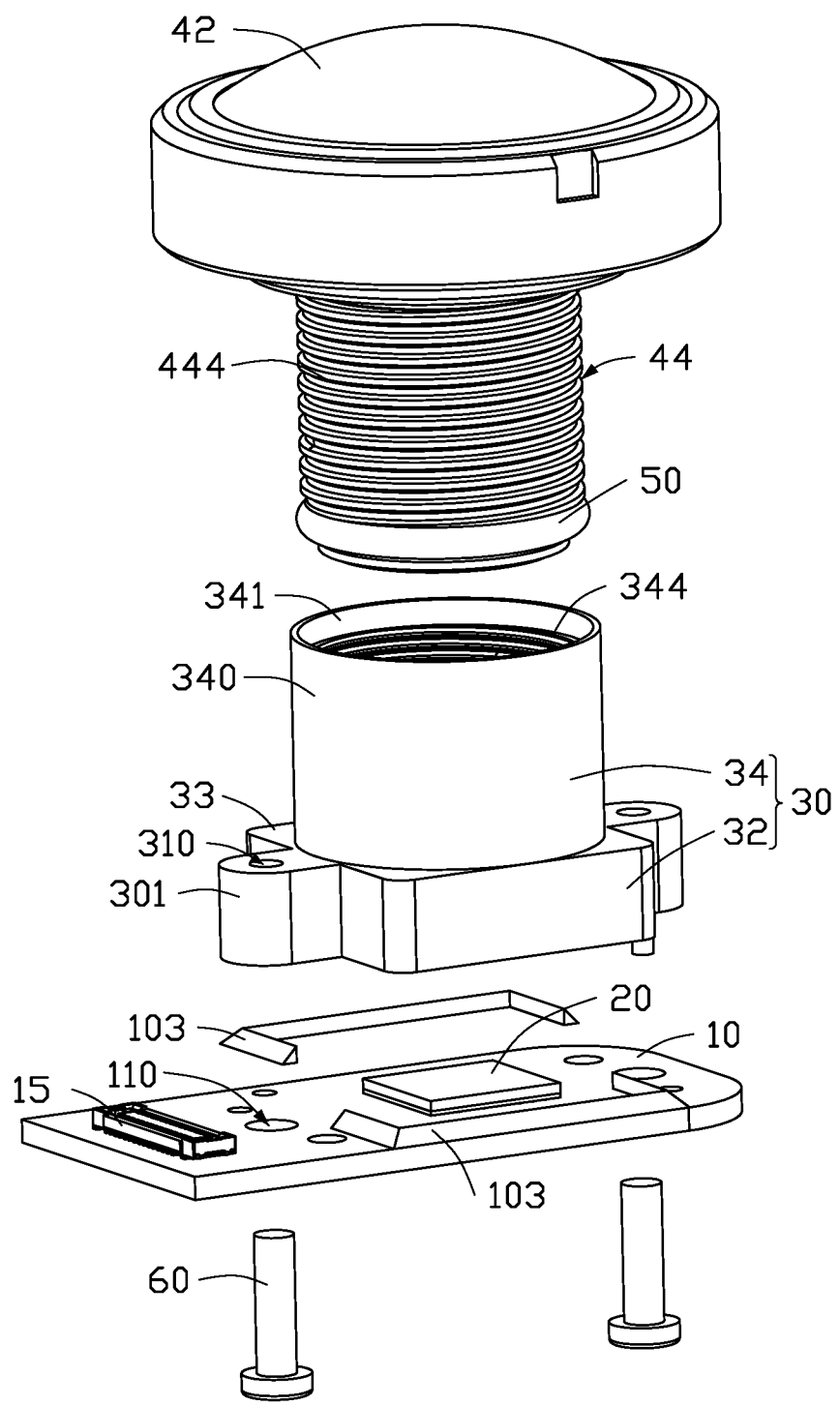
FIG. 2 is an exploded isometric view of the camera module in FIG. 1.
Figure 3:
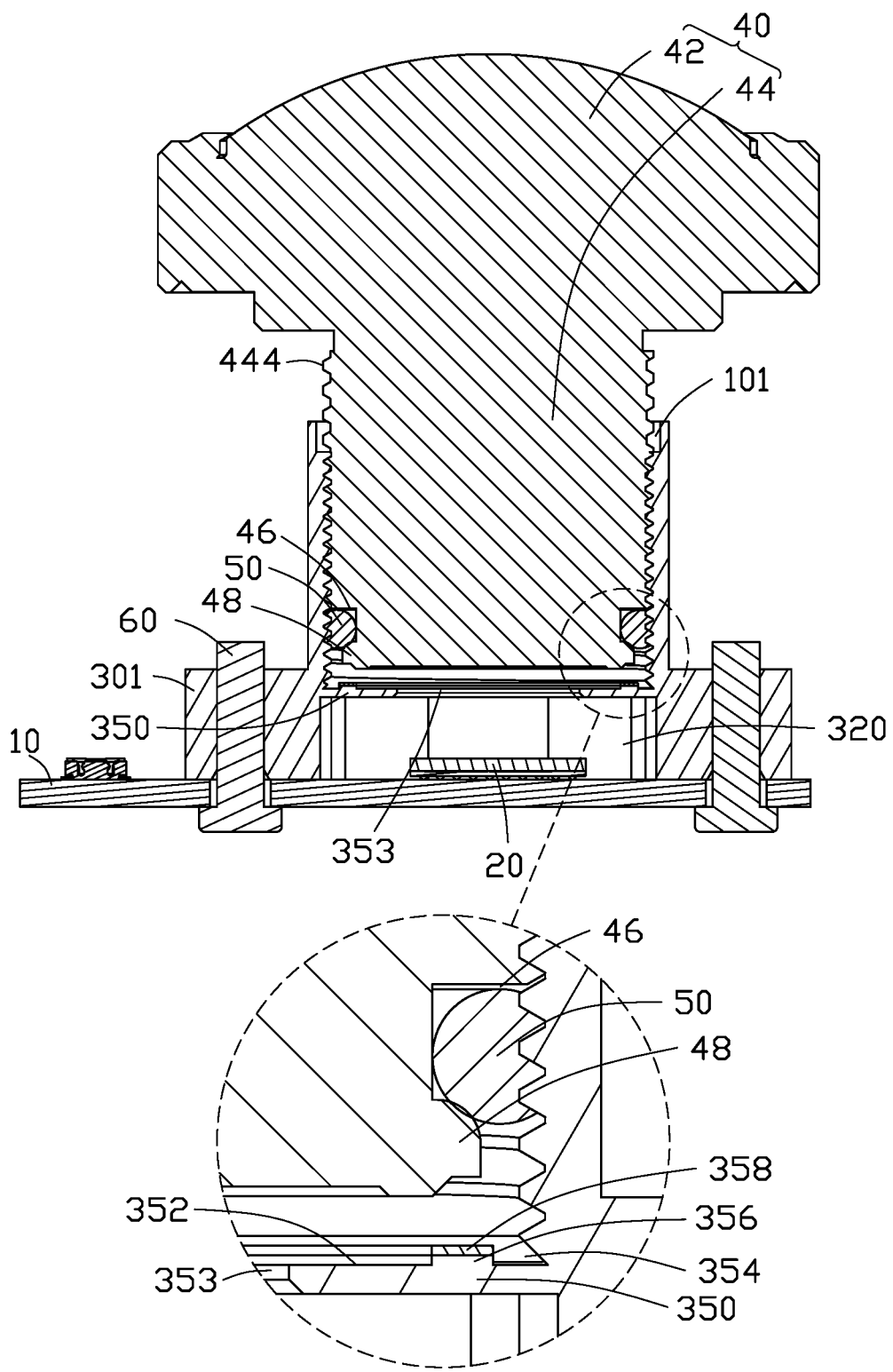
FIG. 3 is a cross-sectional view of the camera module in FIG. 1.
Figure 4:
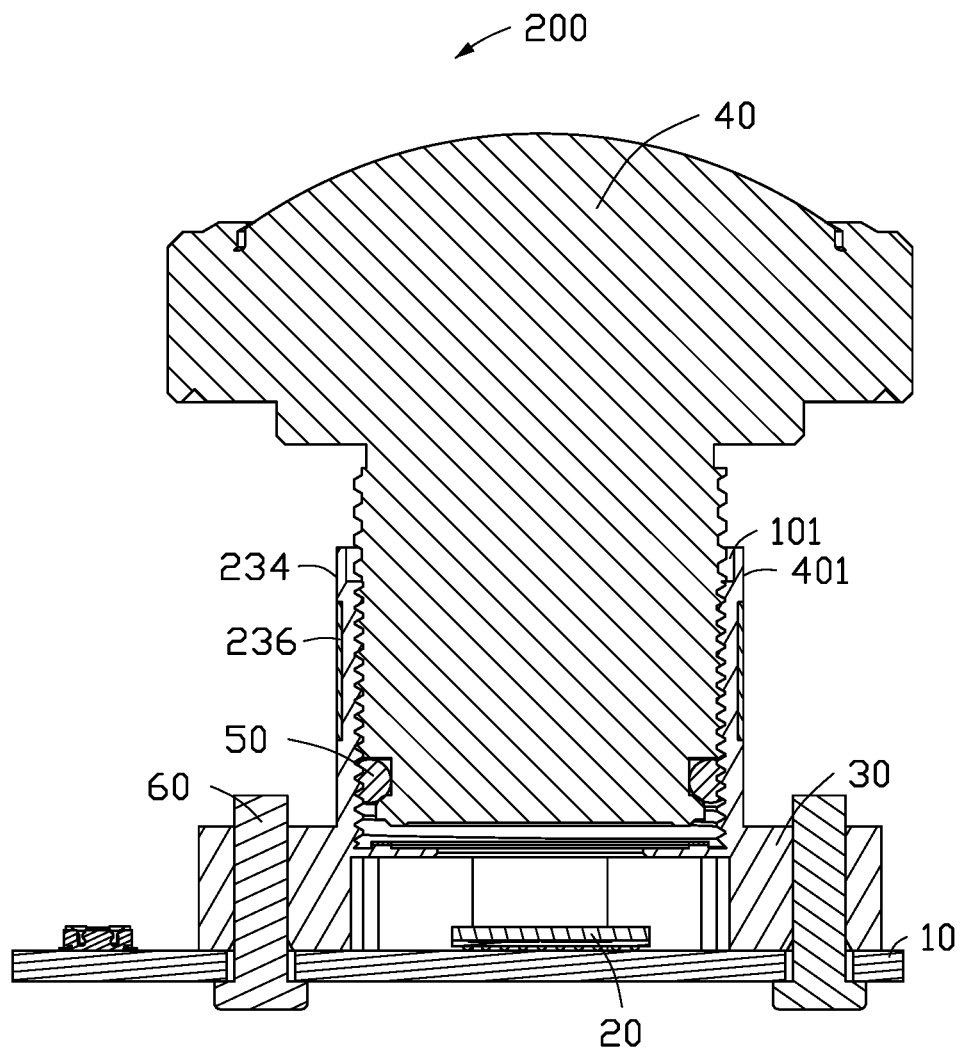
FIG. 4 is a cross-sectional view of a camera module in accordance with one embodiment.

FIG. 4 shows a camera module 200 according to another embodiment. The camera module 200 in FIG. 4 is similar to the camera module 100 in FIG. 3. The difference between the camera module 200 and the camera module 100 in FIG. 2 is that the outer surface 401 of the receiving barrel 234 is an insert molding with a metal sheet 236, the metal sheet 236 surrounding the periphery of the receiving barrel 234.

The metal layer 236 is located below the third annular receiving groove 101 and corresponds to the inner thread 344 of the outer surface 401. The metal sheet 236 strengthens and reinforces the receiving barrel 234, to prevent the receiving barrel 234 from splitting or cracking when the lens barrel 40 is screwed into the lens bracket 30.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A camera module comprising:
a lens bracket and a lens barrel, the lens bracket comprising a receiving barrel, and a plurality of internal threads is formed on an inner surface of the receiving barrel; the lens barrel comprising a plurality of external threads around its circumference surface, and the external threads is matched with the internal threads, wherein a supporting portion is formed at a terminal of the internal threads, and the supporting portion is extended along a radial direction of the receiving barrel, and a first annular receiving groove is formed on the supporting portion and below the internal threads, and a lower end of the lens barrel comprises a second annular receiving groove, and a resilient ring is received in the second annular receiving groove.

2. The camera module of claim 1, further comprising a printed circuit board and an image sensor, wherein the image sensor is mounted on the printed circuit board, and the lens bracket is fixed on the printed circuit board and covers the image sensor.

3. The camera module of claim 1, wherein an outer diameter of the resilient ring in the second annular receiving groove is larger than diameters of the external threads, and the resilient ring is clamped between the second annular receiving groove and the internal threads.

4. The camera module of claim 2, wherein the lens bracket further comprises a pedestal, the pedestal is substantially square and comprises a top surface, the receiving barrel comprises a circumference side wall protruding from the top surface and extending away from the top surface.

5. The camera module of claim 4, wherein the pedestal comprises a hollow accommodation space, and the pedestal is fixed on the printed circuit board, and the hollow accommodation space covers the image sensor.

6. The camera module of claim 5, wherein the supporting portion is formed at a junction of inside the hollow accommodation space and the receiving barrel, the supporting portion extends in a radial direction within the circumference side wall, and the supporting portion opens with a light through hole.

7. The camera module of claim 6, wherein the supporting portion comprises a top end surface toward the internal threads, and the top end surface defines the first annular receiving groove.

8. The camera module of claim 7, wherein the top end surface is formed with an annular flange surrounding the first annular receiving groove, a surface of the annular flange is formed with a layer of black adhesive.

9. The camera module of claim 8, wherein the lens barrel comprises an optical lens portion and an assembly section locating at one end of the optical lens portion.

10. The camera module of claim 9, wherein a bottom of the lens bracket comprises two fixing boards protruding away from a side surface of the pedestal, each of the two fixing boards comprises a mounting hole.

11. The camera module of claim 10, wherein the printed circuit board comprises two fixing holes, each of the two fixing holes matches with a corresponding one of the two mounting holes, and a screw bolt is inserted into each of the two mounting holes and the corresponding one of the fixing holes to fix the lens bracket on the printed circuit board.

12. The camera module of claim 11, wherein the camera module comprises a third annular receiving groove, the third annular receiving groove is formed by a top end of the circumference side wall and the assembly section.

13. The camera device of claim 12, wherein a top end of the circumference side wall has no internal threads, and a thickness of the top end of the circumference side wall is thinner than a thickness of a bottom end, the internal threads are defined on the bottom end of the circumference side wall.

14. The camera module of claim 13, wherein a sealing glue is disposed on the printed circuit board to seal a bottom periphery of the pedestal.

15. The camera module of claim 14, wherein a connector is mounted on the printed circuit board and adjacent to the image sensor, and the connector is electrically connected to the image sensor.

16. The camera module of claim 1, wherein an outer surface of the receiving barrel is an insert molding with a metal sheet, and the metal sheet circles and surrounds a periphery of the receiving barrel.

17. The camera module of claim 16, wherein the metal sheet is located below the third annular receiving groove and corresponds to the inner thread of the outer surface.

18. The camera module of claim 1, wherein a cross-section of the resilient ring is substantially round or square.

* * * * *

UNITED STATES PATENT AND TRADEMARK OFFICE
CERTIFICATE OF CORRECTION

PATENT NO.       : 10,564,523 B2
APPLICATION NO.  : 16/053555
DATED            : February 18, 2020
INVENTOR(S)      : Kun Li et al.

It is certified that error appears in the above-identified patent and that said Letters Patent is hereby corrected as shown below:

On the Title Page

Please replace Item (73) regarding "Assignees" with the following:
(73) TRIPLE WIN TECHNOLOGY (SHENZHEN) CO. LTD., Shenzhen (CN)

Signed and Sealed this
Fourteenth Day of July, 2020

Andrei Iancu
*Director of the United States Patent and Trademark Office*